April 22, 1952  D. H. STOLTENBERG  2,593,626
PARKING WINDSHIELD WIPER MOTOR
OF THE OSCILLATING PISTON TYPE Filed Jan. 29, 1945  3 Sheets-Sheet 1

INVENTOR.
D. HENRY STOLTENBERG

April 22, 1952     D. H. STOLTENBERG     2,593,626
PARKING WINDSHIELD WIPER MOTOR
OF THE OSCILLATING PISTON TYPE
Filed Jan. 29, 1945     3 Sheets-Sheet 2
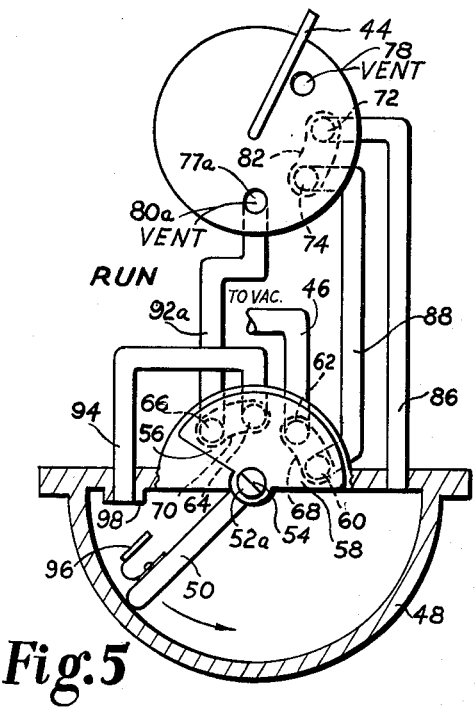
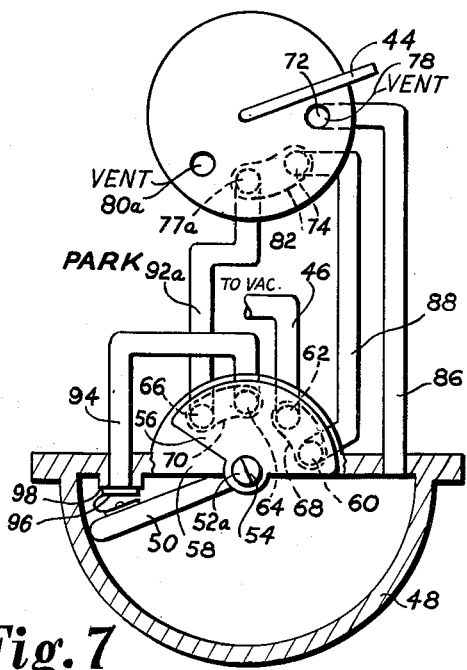
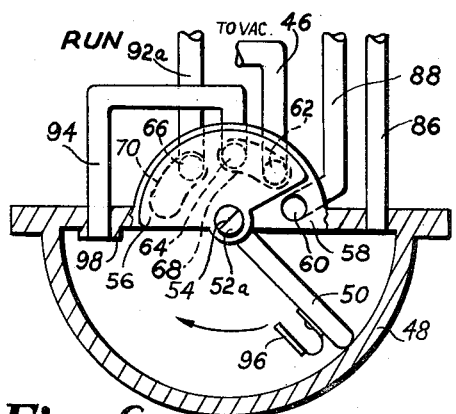
INVENTOR.
D. HENRY STOLTENBERG
BY

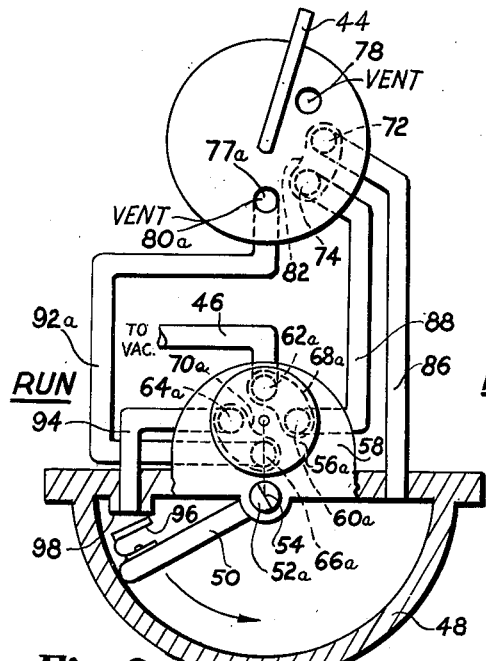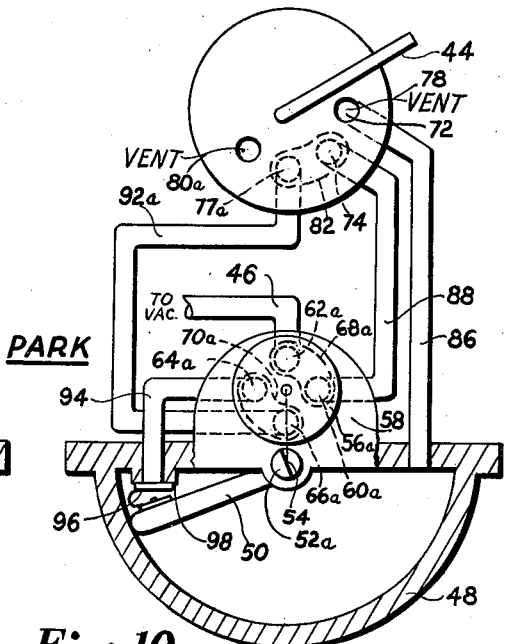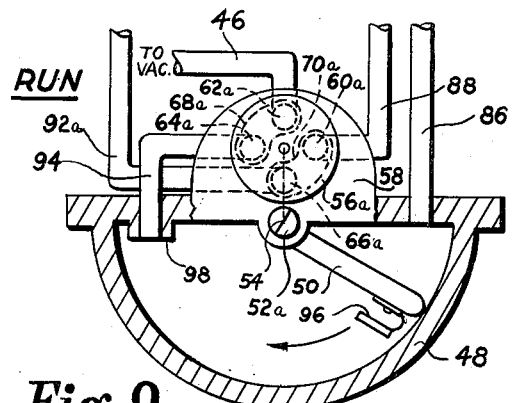

Patented Apr. 22, 1952

2,593,626

UNITED STATES PATENT OFFICE 2,593,626

PARKING WINDSHIELD WIPER MOTOR OF THE OSCILLATING PISTON TYPE

Delbert Henry Stoltenberg, Toledo, Ohio, assignor to The Electric Auto-Lite Company, Toledo, Ohio, a corporation of Ohio Application January 29, 1945, Serial No. 575,037

19 Claims. (Cl. 121—97)

This invention relates to windshield wiper motors, particularly to windshield wiper motors operated by a fluid-pressure differential which is also utilized to hold the motor in a predetermined parked position.

This invention contemplates the provision of a motor operated by a fluid-pressure differential, which is provided with a novel means for parking the motor and its driven windshield wiper member at a predetermined position to place the wiper member at an edge of the windshield and to be held there by said fluid-pressure differential during the inoperative phase of the motor. The invention further contemplates the provision of a novel reversing valve for the motor which is overcontrolled by a manually movable valve member to control the operation of the motor.

It is, therefore, a principal object of this invention to provide a parking windshield wiper motor driven by a fluid-pressure differential having a novel valve mechanism which cooperates with a manual overcontrol device to determine the operative and parking periods of the motor.

It is a further object of this invention to provide a novel parking means for a fluid-pressure operated motor which is controlled by a remote manual control valve.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 5 is an elevational view, partly in section, of a modification of the invention, showing the motor in operative position.

Fig. 6 is an elevational view, similar to Fig. 5, with the automatic reversing valve in its other position.

Fig. 7 is an elevational view, partly in section, showing the modification illustrated in Figs. 5 and 6 in parked position.

Fig. 8 is an elevational view, partly in section, showing another modification of the invention, similar to that shown in Fig. 5, showing the motor in operative relation.

Fig. 9 is an elevational view, partly in section, showing the motor of Fig. 9 with its automatic reversing valve in its other position.

Fig. 10 is an elevational view of the motor shown in Figs. 8 and 9 in parked position.

Figure 1:
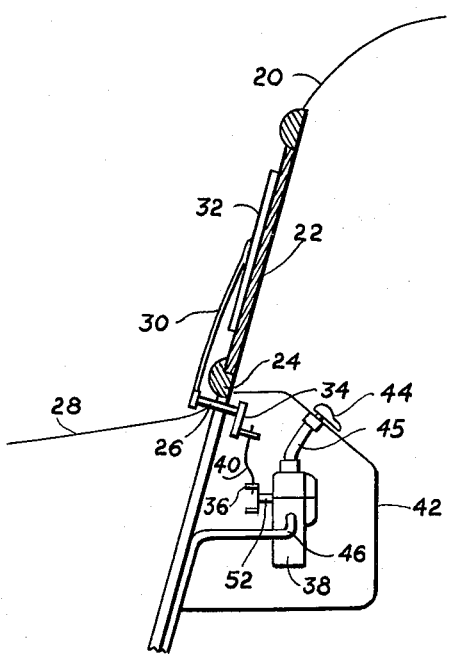
Fig. 1 is an elevational view, partly in section, showing the application of the invention to an automobile.

Referring now to the drawings, particularly to Fig. 1, an automobile body section 20 is shown having a windshield 22 with a lower edge 24, adjacent which a pivot 26 is mounted in the cowl member 28, having mounted thereon on its outer end a windshield wiper arm 30 for driving a blade 32 over the outer surface of the windshield in an arc as is well known in the art. The inner end of the pivot 26 is provided with an arm 34, or the like, which is connected to a driver arm 36 on the fluid-pressure operated motor 38 by a linkage 40. The motor 38 is mounted in any convenient manner (not shown) to the frame of the automobile and furnishes the power to move the blade 32 over the surface of the windshield and to park the same adjacent the lower edge 24. The motor is concealed under a dash 42 and is provided with a manual control 44 which may be connected to the motor by a multi-passage conduit 45 as will be described in greater detail hereinafter. A conduit 46 is provided to communicate with the motor 38 and the intake manifold of the automobile motor (not shown) to utilize the suction therein for driving the windshield wiper motor.

Figure 2:
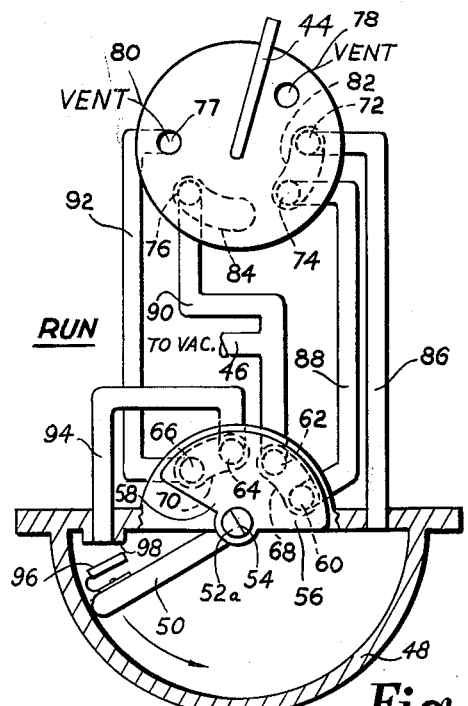
Fig. 2 is an elevational view, partly in section, showing the motor in operative relation with the automatic reversing valve in one position.
Figure 3:
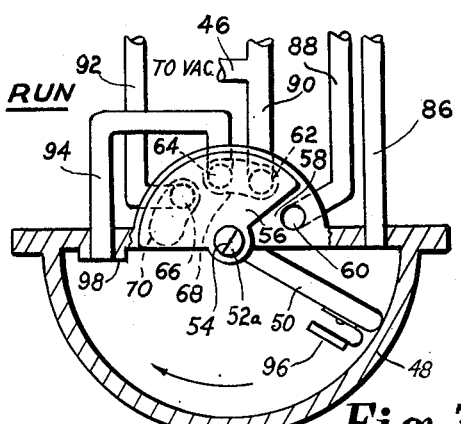
Fig. 3 is an elevational view, similar to Fig. 2, showing the automatic reversing valve in its second position.

The motor 38 may have a casing 48 of semicircular contour as shown in Figs. 2 and 3 having therein a movable vane or piston 50 oscillatable about a shaft 52 journaled in a bearing in the casing. These details of construction of the casing and piston are well known in the art and may be varied widely. The driver arm 36 is attached to one end of shaft 52 (Fig. 1) which projects a substantial distance from the casing. On the other end 52a of the shaft a non-circular portion 54 is provided which drives an automatic valve control mechanism (not shown) which may be similar to any of the control mechanisms well known in the art, usually involving an overcenter device which snaps over from one position to another through a lost motion connection with shaft 52 after the shaft has been oscillated by the piston 50 through a predetermined angle. This automatic control mechanism moves a flop valve 56 through an angle around the shaft 52 on which the valve is pivoted sufficiently to reverse the application of a fluid-pressure differential to the two sides of the piston 50 in the chambers formed thereby in the casing 48.

The motor casing 48 is provided with a valve seat 58 on which the automatic reversing valve member or flop valve 56 is moved to reverse the application of the fluid-pressure differential. The valve seat 58 is pierced with four ports 60, 62, 64 and 66 which are preferably equally spaced from each other and juxtaposed on the arc of a circle having its center concentric with the shaft 52 about which the flop valve 56 moves. The flop valve is provided with a pair of ducts 68 and 70 which cooperate with the ports to reverse the application of fluid pressure to the motor as will be described in greater detail hereinafter.

Cooperating with the motor 38 is a manual control valve 44 which may be mounted on the dash 42 as shown in Fig. 1, and connected to the motor by a multi-passage conduit 45 as described and claimed in application Serial No. 563,263 filed November 13, 1944, now Patent No. 2,583,348, or, if desired, it may be mounted directly on the motor casing 48 either separably or integrally. The manual control valve is provided with a fixed portion which is pierced with four ports 72, 74, 76 and 77 while the movable portion in operable relation with the fixed portion is provided with two venting ports 78 and 80 and two ducts 82 and 84. Vent port 78 is adapted to cooperate with port 72, while vent port 80 cooperates with port 77. Duct 82 cooperates with ports 72 and 74, while duct 84 cooperates with ports 76 and 77 to place these ports in communication at predetermined times as will be set forth in greater detail hereinafter.

Port 72 of the manual control valve 44 is placed in communication with the right chamber of the motor casing by conduit 86, and port 74 thereof is placed in communication with port 60 of the valve seat 58 by conduit 88. Port 76 is placed in communication with a source of suction and with port 62 of the valve seat 58 by conduit 90 which cooperates with conduit 46 already described. Port 77 is placed in communication with port 66 on the valve seat 58 by conduit 92, and port 64 of the valve seat is placed in communication with the left chamber of the casing 48 by conduit 94. The chamber terminus of the conduit 94 cooperates with a valve 96 mounted resiliently on the piston 50, by a boss 98 integral with the casing, so that the conduit 94 may be closed thereby.

With the manual control valve 44 in "run" position as illustrated in Fig. 2, ports 72 and 74 thereof are bridged by duct 82, to place them in communication, while port 76 is closed and port 77 is vented by vent port 80. At the valve seat 58 on the casing 48, ports 60 and 62 are bridged by duct 68 of the flop valve 56, and ports 64 and 66 are bridged by duct 70, so that the respective pairs of ports are placed in communication by the flop valve. Port 62, being in communication with a source of suction by conduits 90 and 46, causes air to flow from the right chamber through conduit 86, thence through port 72 into duct 82 to port 74, through conduit 88 to port 60, and thence through duct 68 to port 62, so that a partial vacuum is created in the right chamber. The right chamber is in communication with the atmosphere by air flowing into vented port 77 through conduit 92 to port 66 in the valve seat 58, through duct 70 to port 64 and thence through conduit 94 to the right chamber of the casing. This will move the piston 50 counterclockwise as shown by the arrow in Fig. 1.

When the piston 50 moves through a predetermined arc the automatic reversing valve or flop valve 56 is actuated and moved to a position shown in Fig. 3. The manual control valve 44 will obviously be unchanged, and a reversal of the fluid-pressure differential active on the piston 50 is brought about by this movement of the flop valve. By the movement port 60 is exposed to the atmosphere while ports 62 and 64 are bridged by duct 68, and port 66 is closed and made ineffective. The vacuum active at port 62 will then create a partial vacuum in the left chamber through conduit 94, port 64 and duct 68. The right chamber will be vented by atmosphere flowing into port 60, through conduit 88 to port 74, through duct 82 to port 72, thence by conduit 86 to the chamber. This will cause a clockwise movement of the piston 50, until the flop valve 56 is again actuated after the piston moves the predetermined arc to again assume the position shown in Fig. 2 to start a new cycle of operation.

Figure 4:
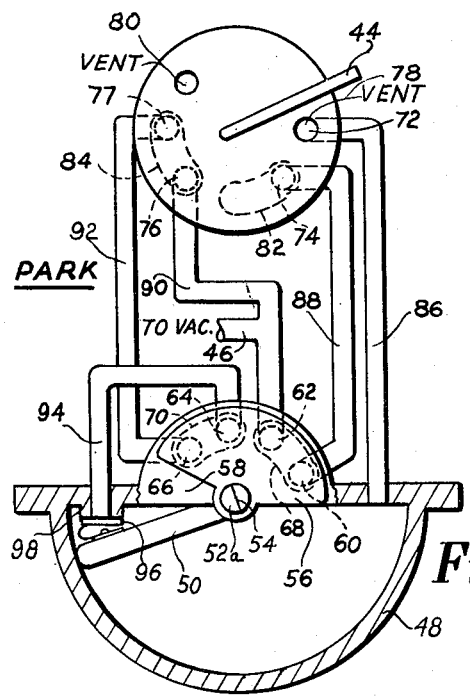
Fig. 4 is an elevational view, partly in section, showing the motor in parked position.

When an operator desires to terminate the operation of the motor and to park the same, he will move the manual control valve 44 to the position shown in Fig. 4, whereby vent port 78 covers port 72 to vent the same, port 74 is closed, and ports 76 and 77 are bridged by duct 84 to place them in communication. The vacuum active at ports 62 and 76 will then create a partial vacuum in the left chamber, whether the flop valve 56 is in one position or the other. In the position shown in Fig. 4, the flow from the chamber will proceed through conduit 94 to port 64, through duct 70 to port 66, through conduit 92 to port 77, and thence through duct 84 to port 76. Atmosphere will flow to the right chamber through port 72 and conduit 86 to the chamber. This will park the motor. With the flop valve in the position shown in Fig. 3, the flow from the left chamber will proceed in the same manner to port 64, and from there it flows through duct 68 to port 62. The venting of the right chamber will be the same as before and the piston will move clockwise until the flop valve reverses to the first position already described and will remain there through the parking period.

In the modification of the invention shown in Figs. 5, 6 and 7, the manual control valve 44 has been simplified and its relation to the valve seat 58 has been modified. Conduit 90 and its port 76, including the duct 84, have been dispensed with as shown in the modifications illustrated in Figs. 2, 3 and 4. Port 66 on the valve seat 58 is placed in communication with port 77a of the manual control valve by conduit 92a. Port 77a is positioned in spaced relation with port 74 heretofore described with reference to the first modification and with duct 82, so that ports 74 and 77a are placed in communication by the duct 82 when the manual control valve is moved to "park" position. A second vent port 80a is provided to vent port 77a when the manual control valve is in "run" position.

The normal operation of this modification is the same as that already described with reference to the first described modification. In "park" position of the manual control valve, the flow of the fluid pressure is the same when the flop valve 56 is in the position shown in Fig. 6. With the flop valve in the position shown in Figs. 5 and 7, the flow will be from the left chamber through conduit 94 to port 64, through duct 70 to port 66, through conduit 92a to port 77a, through duct 82 to port 74, through conduit 88 to port 60 and through duct 68 to port 62. Venting of the right chamber is same as before.

In this modification one of the conduits between the valve seat 58 and the manual control valve 44 is dispensed with and an idle conduit is utilized in its stead, as first disclosed in the earlier modification. All the other details are not substantially modified.

In the modification disclosed in Figs. 8, 9 and 10, the relation of the ports on the valve seat 58 are modified, and arranged in the form of a square, with the suction supply port 62a and the vent port 66a positioned on one diagonal, while the two chamber ports 60a and 64a are on the second diagonal. The flop valve 56a is also modified to conform, with the ducts 68a and 70a arranged to parallel the sides of the square arrangement of the ports 60a, 62a, 64a and 66a, so that in one position (Fig. 8) duct 68a bridges ports 60a and 62a while duct 70a bridges ports 64a and 66a. In the second position of the flop valve, substantially 90° displaced from the first (Fig. 9), duct 68a bridges ports 62a and 64a, while duct 70 bridges ports 60a and 66a. In other respects this modification may be similar to the modification disclosed in Figs. 5, 6 and 7.

With the manual control valve 44 in "run position as shown in Fig. 8, fluid will flow from the right chamber of the casing 48 through conduit 86 to port 72 in the control valve, through duct 82 to port 74, through conduit 88 to port 60a on the valve seat 58, and through duct 68a in the flop valve 56a to port 62a which is connected to the source of vacuum by conduit 46. In the left chamber, atmosphere will enter vent port 80a and port 77a, through conduit 92a to port 66a in the valve seat 58, through duct 70a in the flop valve 56a to port 64a, and then through conduit 94 to the left chamber. This will cause a counterclockwise movement of the piston 50.

When the piston 50 has moved through its predetermined arc the flop valve 56a will be moved by the automatic valve mechanism (not shown) to the position shown in Fig. 9 with the manual control valve 44 still in "run" position as shown in Fig. 8. The left chamber will then be partially evacuated by the fluid flowing therefrom through conduit 94 to port 64a, then through duct 68a of the flop valve 56a to port 62a which, as before stated, is in communication with source of vacuum by conduit 46. The atmosphere will flow into the right chamber by entering again through vent port 80a to port 77a, through conduit 92a to port 66a, through duct 70a in the flop valve 56a to port 60a, through conduit 88 to port 74, through duct 82 to port 72, and through conduit 86 to the right chamber. This will cause a clockwise movement of the piston 50 until the flop valve 56a is again actuated by the automatic reversing mechanism to again assume the position shown in Fig. 8 to begin a new cycle of operation.

When an operator wishes to park the wiper, he moves the manual control valve 44 to "park" position shown in Fig. 10. This will vent the right chamber to the atmosphere, irrespective of the position of the flop valve 56a. The atmosphere will enter vent port 78 and port 72, and move through conduit 86 to the right chamber. The left chamber will be subject to a partial evacuation with the manual control valve 44 in "park" position, also irrespective of the position of the flop valve 56a. With the flop valve 56a in the position shown in Figs. 8 and 10, fluid will flow from the left chamber through conduit 94 to port 64a, through duct 70a to port 66a, through conduit 92a to port 77a, through duct 82 to port 74, through conduit 88 to port 60a and through duct 68a to port 62a which is in communication with a source of suction by conduit 46. With the flop valve in the position shown in Fig. 9, the left chamber will be partially evacuated by the same route as used in normal operation already described viz. through conduit 94 to port 64a, through duct 68a to port 62a.

This will "park" the piston 50 as shown in Fig. 10 with the valve 96 against boss 98.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed:

1. In a device of the class described, a motor having a casing including a portion movable therein when subject to a fluid-pressure differential, automatic valve means controllable by the movable portion to reverse the pressure differential at predetermined times with reference to the position of the movable portion, a valve seat on the casing having four ports, including a pair of chamber ports, a suction supply port and a vent port, said valve means having a pair of cooperating passages to control the flow of the fluid to said motor through said ports, and a manually movable control valve operatively connected to said ports to determine the operative and parking periods of the motor.

2. In a device of the class described, a motor having a casing including a portion movable therein when subject to a fluid-pressure differential, automatic valve means controllable by the movable portion to reverse the pressure differential at predetermined times with reference to the position of the movable portion, a valve seat having four ports, including a suction supply port, a vent port, and a pair of chamber ports, one chamber port communicating directly to one side of the casing while the other chamber port has communication capable of interruption, said valve means having a pair of cooperating passageways controlling the flow of the fluid through said ports to said motor and a manually movable control valve controlling the communication of the vent port and the other chamber port, whereby in parked position, the vent port is connected to the other chamber port and the chamber of the other chamber port is vented to atmosphere.

3. In a device of the class described, a motor having a casing including a portion movable therein when subject to a fluid-pressure differential and dividing the casing into a pair of chambers, automatic valve means controllable by the movable portion to reverse the pressure differential at predetermined times with reference to the position of the movable portion, a valve seat on the casing having four ports including a suction supply port, a vent port and first and second chamber ports, said ports being arranged in an arc of a circle with the chamber ports juxtaposed on opposite sides of the suction supply port, a manually movable control valve having at least three ports in one portion thereof a conduit establishing communication between the vent port and one port of the control valve, a second conduit establishing communication between the first chamber port and one chamber, a third conduit establishing communication between a second port of the control valve and the other side of the chamber, a fourth conduit establishing communication between the second chamber port and a third port of the control valve said automatic valve means having two cooperating passages to control the reversal of the fluid-pressure differential to the motor, the control valve in one position, venting the conduit communicating with the vent port and connecting the third and fourth conduits to establish communication between the said second chamber port and its chamber, and in a second position venting the third conduit and connecting the first conduit to the fourth conduit for parking the motor.

4. In a device of the class described, a motor having a casing including a portion movable therein when subject to a fluid-pressure differential, automatic valve means controllable by the movable portion to reverse the pressure differential at predetermined times with reference to the position of the movable portion, a valve seat on the casing having four ports including a suction supply port, a vent port and a pair of chamber ports, said ports being arranged on the corners of a square with the chamber ports on one diagonal and the vent and suction supply ports on the other diagonal, a manually movable control valve, a first and second conduit establishing communication between the vent port and one chamber port with the control valve respectively, a third conduit establishing communication between the other chamber port and one chamber, a fourth conduit establishing communication between the control valve and the other side of the chamber, said automatic valve means having two cooperating passages to control the reversal of the fluid-pressure differential to the motor through said ports, the control valve in a first position, venting the first conduit communicating with the vent port and connecting the second and fourth conduits to establish communication between the chamber port and its chamber, and in a second position venting the fourth conduit and connecting the first conduit to the second conduit for parking the motor.

5. In a device of the class described, a motor having a casing including a portion movable therein when subject to a fluid-pressure differential defining a pair of chambers, automatic valve means controllable by the movable portion to reverse the pressure differential at predetermined times with reference to the position of the movable portion, a valve seat for the automatic valve means having four ports including a suction supply port, a vent port and a pair of chamber ports, said ports being arranged on the corners of a quadrangle with the chamber ports on one diagonal and the vent and suction supply ports on the other diagonal, a remote manually movable control valve, a first and second conduit establishing communication between the vent port and one chamber port with the control valve, respectively, a third conduit establishing communication between the other chamber port and one chamber, a fourth conduit establishing communication between the control valve and the other side of the chamber, said automatic valve means having two cooperating passages moving relative to the ports to control the reversal of the fluid-pressure differential to the motor, the control valve in a first operative position, venting the first conduit communicating with the vent port and connecting the second and fourth conduits to establish communication between the one chamber port and its chamber, and in a second position venting the fourth chamber conduit and connecting the first conduit to the second conduit for parking the motor.

6. In a device of the class described, a motor having a casing including a portion movable therein when subject to a fluid-pressure differential, automatic valve means controllable by the movable portion to reverse the pressure differential at predetermined times with reference to the position of the movable portion, a valve seat on the casing having four ports including a suction supply port, a vent port and a pair of chamber ports, a manually movable control valve, first and second conduit establishing communication between the vent port and one chamber port with the control valve, respectively, a third conduit establishing communication between the other chamber port and one chamber, a fourth conduit establishing communication between the control valve and the other side of the chamber, a fifth conduit establishing communication between the suction supply port and the control valve, said automatic valve means having two cooperating passages to control the reversal of the fluid-pressure differential to the motor, the control valve in a first operative position, venting the first conduit communicating with the vent port and connecting the second and fourth conduits to establish communication between the chamber port and its chamber and closing the fifth conduit, and in a second position venting the fourth chamber conduit and connecting the first conduit to the fifth conduit and closing the second conduit for parking the motor.

7. In a device of the class described, a motor having a casing including a portion movable therein when subject to a fluid-pressure differential, automatic valve means controllable by the movable portion to reverse the pressure differential at predetermined times with reference to the position of the movable portion, a valve seat on the casing having four ports including a suction supply port, a vent port and a pair of chamber ports, said ports being arranged on the corners of a square with the chamber ports on one diagonal and the vent and suction supply ports on the other diagonal, a manually movable control valve having three ports in one portion thereof, two of which are in communication with the vent port and a first chamber port on the valve seat, respectively, the third port being in communication with the chamber cooperating with the aforementioned first chamber port, the other chamber port of the valve seat communicating directly with the other chamber, said control valve in a first operative position venting the vent port of the valve seat and connecting the other two ports therein to establish communication between the first chamber port therein and its chamber, and in a second position venting the third port and connecting the other two ports to park the motor.

8. In a device of the class described, a motor having a casing including a portion movable therein when subject to a fluid-pressure differential, said movable portion dividing the casing into a pair of chambers, a valve seat on the casing having at least four ports including a suction supply port, a vent port, and a pair of chamber ports, automatic valve means controllable by the movable portion to reverse the pressure differential at predetermined times having reference to the position of the movable portion, said automatic valve means including a member having a pair of passageways cooperating with said valve seat and ports thereof, a control valve, conduits cooperating with the chambers, the ports on the valve seat and the control valve, to allow communication through the conduits for the flow of fluid to operate the motor when the control valve is in a first operative position, said control valve in a second position controlling the communication of the conduits between the chamber ports and the vent port to prevent reversal of the application of the fluid pressure differential by the automatic valve means to park the movable portion at one side of the casing.

9. In a device of the class described, a motor having a casing including a portion movable therein when subject to fluid-pressure differential, said movable portion dividing the casing into a pair of chambers, a valve seat on the casing having at least four ports including a suction supply port, a vent port, and a pair of chamber ports, automatic valve means controllable by the movable portion to reverse the pressure differential at predetermined times having reference to the position of the movable portion, said automatic valve means including a member having a pair of passageways cooperating with said valve seat and ports thereof, a control valve, conduits cooperating with the chambers, the ports on the valve seat and the control valve, to allow communication through the conduits for the flow of fluid to operate the motor when the control valve is in a first operative position, said control valve in a second position changing the communication between the ports of the valve seat and the chambers whereby the fluid pressure differential remains unchanged in either of the two positions of the automatic valve means to park the movable portion at one side of the casing.

10. In a device of the class described, a motor having a casing including a portion movable therein when subject to a fluid-pressure differential, said movable portion dividing the casing into a pair of chambers, a valve seat on the casing having at least four ports including a suction supply port, a vent port, and a pair of chamber ports, automatic valve means controllable by the movable portion to reverse the pressure differential at predetermined times having reference to the position of the movable portion, said automatic valve means including a member having a pair of passageways cooperating with said valve seat and ports thereof, a control valve, conduits cooperating with the chambers, the ports on the valve seat and the control valve, to allow communication through the conduits for the flow of fluid to operate the motor when the control valve is in a first operative position, said control valve in a second position changing the relations in the communications of the conduits between the ports of the valve seat and the chambers whereby the fluid-pressure differential is applied to the chamber in a predetermined relation, irrespective of the position of the member of the automatic valve means.

11. In a device of the class described, a motor having a casing including a portion movable therein when subject to a fluid-pressure differential, said movable portion dividing the casing into a pair of chambers, a valve seat on the casing having four ports including a suction supply port, a vent port, and a pair of chamber ports, a valve member having a pair of passageways cooperating with the valve seat and the ports therein controlled by an automatic reversing means to reverse the application of the fluid-pressure differential having a timed relation to the movement of the movable portion, a control valve, conduits cooperating with the chambers, the ports on the valve seat and the control valve to establish communication therebetween for the flow of fluid to operate the motor with the control valve in a first operative position, the control valve in a second position changing the communication between the chambers and the ports on the valve seat so that the valve member will apply the fluid-pressure differential in a predetermined relation to the chambers whereby the movable portion is parked at one side of the casing.

12. In a device of the class described, a motor having a casing including a portion movable therein when subject to a fluid-pressure differential, said movable portion dividing the casing into a pair of chambers, a valve seat on said casing having four ports including a pair of chamber ports, suction supply port, and a vent port, a valve member having a pair of cooperating passages cooperating with the ports on the valve seat to control the flow of fluid to said motor through said ports, said valve member being controlled by an automatic reversing means to reverse the application of the fluid-pressure differential having a timed relation to the movement of the movable portion and a manually-movable control valve operatively connected to said ports and said chambers to determine the operative and parking periods of the motor.

13. In a device of the class described, a motor having a casing including a portion movable therein when subject to a fluid-pressure differential, said movable portion dividing the casing into a pair of chambers, a valve seat on the casing having four ports including a suction supply port, a vent port, and a pair of chamber ports, automatic valve means controllable by the movable portion to reverse the fluid-pressure differential at predetermined times with reference to the position of the movable portion, said valve means having a pair of operating passages slidable on the valve seat and cooperating with the ports therein to control the flow of fluid to said motor through said ports, and a manually movable control valve operatively connected to said ports and said chambers to control the flow of fluid between said ports and said chambers whereby, in one position of the control valve, the valve means automatically reverses the application of the fluid-pressure differential to the chambers to operate the motor and in a second position of the control valve, the valve means applies the fluid-pressure differential in a predetermined relation to the chambers, irrespective of its position with relation to the ports on the valve seat to park the motor.

14. In a windshield cleaner motor, a fluid-pressure casing, a member movable therein when subject to fluid-pressure differential, primary chamber ports located on opposite sides of said movable member, a valve seat on said casing including a suction supply port and secondary chamber ports, valve means associated with said valve seat and controllable by the movable member for connecting one of the secondary chamber ports alternately with the suction supply and with the atmosphere to obtain reversal of the application of the pressure differential to the primary chamber ports for the operation of said movable member, manually operable control valve mechanism including venting means and fluid passage means from the primary chamber ports and valve seat ports leading to ports on said valve mechanism located adjacent to the venting means communicating at all times with the atmosphere, the valve mechanism operable in one position to connect said venting means with one of said secondary chamber ports for the operation of the movable member and in a second position to connect said venting means to a primary chamber port to park the movable member in one position.

15. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor, said valve mechanism including reversing valve means having means defining passage means for connecting said supply passage to said motor and being automatically operable at said limits to reverse said connection, and control valve means operable to reverse the connection, through said reversing valve passage means, of said supply passage to said motor.

16. In a fluid motor, first and second members defining first and second chamber spaces and movable relative to each other back and forth between normal limits under the influence of a reversibly applied differential between higher and lower fluid pressures, means defining a supply passage adapted for connection to a source of one of said pressures and at least a pair of passages corresponding respectively to said chamber spaces, valve mechanism for controlling said motor, said valve mechanism including reversing valve means having a single cavity for connecting said supply passage alternately to said chamber passages and being automatically operable at said limits to reverse said connection, and a control valve means operable, at any time regardless of the position of said reversing valve means to establish a connection, through said reversing valve cavity, of said supply passage to said motor which causes a said relative movement toward one of said limits.

17. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor including reversing and control valves for providing running and parking connections between said motor and said passage, certain of said running connections including said valves in series and others thereof including only said reversing valve, said reversing valve being automatically operable at said limits, said control valve being movable between a first position in which it establishes said running connections and in which said reversing valve is operable to reverse the connection between said passage and said motor and a second position in which it establishes said parking connections and in which said reversing valve is ineffective to so reverse said connection.

18. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor, said valve mechanism including reversing valve means having means defining passage means for connecting said supply passage to said motor and being automatically operable at said limits to reverse said connection, and means for causing the said relative motor movement to continue beyond at least one of said normal limits including control valve means operable, at any time regardless of the position of said reversing valve means to establish a connection through said reversing valve passage means of said supply passage to said motor which causes a said relative movement toward one of said limits.

19. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor, said valve mechanism including reversing valve means, having a seat through which said supply passage opens and a valve element movable back and forth on said seat, said valve element having means defining passage means for connecting said supply passage to said motor and being automatically operable at said limits to reverse said connection, and control valve means operable to reverse the connection, through said reversing valve passage means, of said supply passage to said motor.

D. HENRY STOLTENBERG.

REFERENCES CITED

The following references are of record in the file of this patent:

UNITED STATES PATENTS

| Number | Name | Date |
|---|---|---|
| 1,840,233 | Hueber | Jan. 5, 1932 |
| 2,257,534 | Renwick | Sept. 30, 1941 |

FOREIGN PATENTS

| Number | Country | Date |
|---|---|---|
| 473,296 | Great Britain | Oct. 11, 1937 |